(12) United States Patent
Remaker

(10) Patent No.: US 7,271,502 B1
(45) Date of Patent: Sep. 18, 2007

(54) COMBINED ETHERNET SWITCH AND POWER STRIP

(75) Inventor: Phillip Andrew Remaker, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 475 days.

(21) Appl. No.: 10/791,567

(22) Filed: Mar. 1, 2004

(51) Int. Cl.
*H02J 1/00* (2006.01)
(52) U.S. Cl. .................... 307/38; 361/641; 709/223
(58) Field of Classification Search ........... 439/501, 439/650, 653, 639, 142, 144; 307/115, 38, 307/43; 361/622, 626, 641, 88; 395/750, 395/838; 709/222, 223
See application file for complete search history.

(56) References Cited

U.S. PATENT DOCUMENTS 5,506,790 A * 4/1996 Nguyen ................. 700/286

7,043,543 B2 * 5/2006 Ewing et al. ............... 709/223

* cited by examiner

*Primary Examiner*—Rajnikant B. Patel
(74) *Attorney, Agent, or Firm*—Sierra Patent Group, Ltd.

(57) ABSTRACT

The disclosed device is directed towards a combined network switch and power strip including a housing defining an interior and an exterior. A power cord is coupled to the housing. A power surge protector coupled to the power cord is disposed in the housing. An electrical power switch is coupled to the surge protector and is disposed in the housing. An array of electrical outlets is coupled to the electrical power switch and is disposed in the housing in operative communication between the interior and the exterior. A power transformer is coupled to the power surge protector in the housing interior. A network switch is coupled to the power transformer and is disposed in the housing interior. The network switch includes a network port array in operative communication between the interior and the exterior. A network connection is in operative communication with the network switch and a network outlet.

20 Claims, 4 Drawing Sheets

COMBINED ETHERNET SWITCH AND POWER STRIP

BACKGROUND

The present disclosure relates to the field of network switching and power supply. In particular, the disclosure relates to a combined network switch and power strip for combining network connections and electrical power supply for a computer network.

In less complex computer networks, there are clusters of computers near a single electrical power outlet and a network jack. The home office and small business office network systems have from about two to four computers arranged as described above.

Referring to FIG. 1, the prior art computer network 10 includes three computers 12 having power cords 14 coupled to a power strip 16 plugged into an electrical wall outlet 18. A prior art network hub/switch 20 includes multiple ports 22. The prior art network hub/switch 20 is coupled to a network outlet 24. The prior art network hub/switch 20 includes a separate power transformer 26 plugged into the electrical wall outlet 18.

The prior art system is susceptible to accidental power disconnection to the network hub/switch 20. The prior art network hub/switch 20 and separate power strip 16 occupy a large space, and include a bulky power transformer 26 that obstructs free space and can be easily unplugged. The prior art system is not practical in small office environments, where space is always a premium.

What is needed in the art is a unitary combined network switch and power strip for combining network connections and electrical power supply to a computer network.

SUMMARY

The disclosed device is directed towards a combined network switch and power strip including a housing defining an interior and an exterior. A power cord is coupled to the housing. A power surge protector coupled to the power cord is disposed in the housing. An electrical power switch is coupled to the surge protector and is disposed in the housing. An array of electrical outlets is coupled to the electrical power switch and is disposed in the housing in operative communication between the interior and the exterior. A power transformer is coupled to the power surge protector in the housing interior. A network switch is coupled to the power transformer and is disposed in the housing interior. The network switch includes a network port array in operative communication between the interior and the exterior. A network connection is in operative communication with the network switch and a network outlet.

Another embodiment is disclosed and directed toward a combined network switch and power strip. The combined network switch and power strip includes a means for linking a computer network with a power supply and a network connection outlet with the combined network switch and power strip. A housing means defines an interior and an exterior. A means for power surge protection is disposed in the housing interior and is coupled to a means for power supply. A means for switching electrical power is coupled to the means for power surge protection and is disposed in the housing means in operative communication between the interior and the exterior. A means for receiving electrical cords is coupled to the means for switching electrical power and is disposed in the housing in operative communication between the interior and the exterior. A means for transforming power is coupled to the means for power surge protection and is disposed in the housing means interior. A means for switching network connection is coupled to the means for transforming power and is disposed in the housing means interior. A means for connection to a network is in operative communication with a network outlet.

A method for using combined network switch and power strip is disclosed. The method comprises linking a computer network with a power supply and a network connection outlet with a combined network switch and power strip. The combined network switch and power strip includes a housing defining an interior and an exterior. A power cord is coupled to the housing. A power surge protector is disposed in the housing interior and is coupled to the power cord. An electrical power switch is coupled to the surge protector and is disposed in the housing in operative communication between the interior and the exterior. An array of electrical outlets is coupled to the electrical power switch and is disposed in the housing in operative communication between the interior and the exterior. A power transformer is coupled to the power surge protector and is disposed in the housing interior. A network switch is coupled to the power transformer and is disposed in the housing interior. A network connection is in operative communication with the network switch and a network outlet. The method includes coupling the network connection with the network outlet. The method includes coupling the power cord with the electrical power outlet.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

The disclosure describes an exemplary combined network switch and power strip. The combined network switch and power strip includes a housing containing a power transformer coupled to a power feed. A surge protector is coupled to the power transformer and array of electrical outlets and is configured to disconnect the electrical power responsive to a predetermined power surge. The power transformer supplies electrical power to a network switch. The network switch includes an array of network ports. Indicators can be coupled to the network switch ports and configured to indicate connection to the network. The network switch can be coupled to a network outlet via a network cable or through a wireless coupling.

Figure 1:
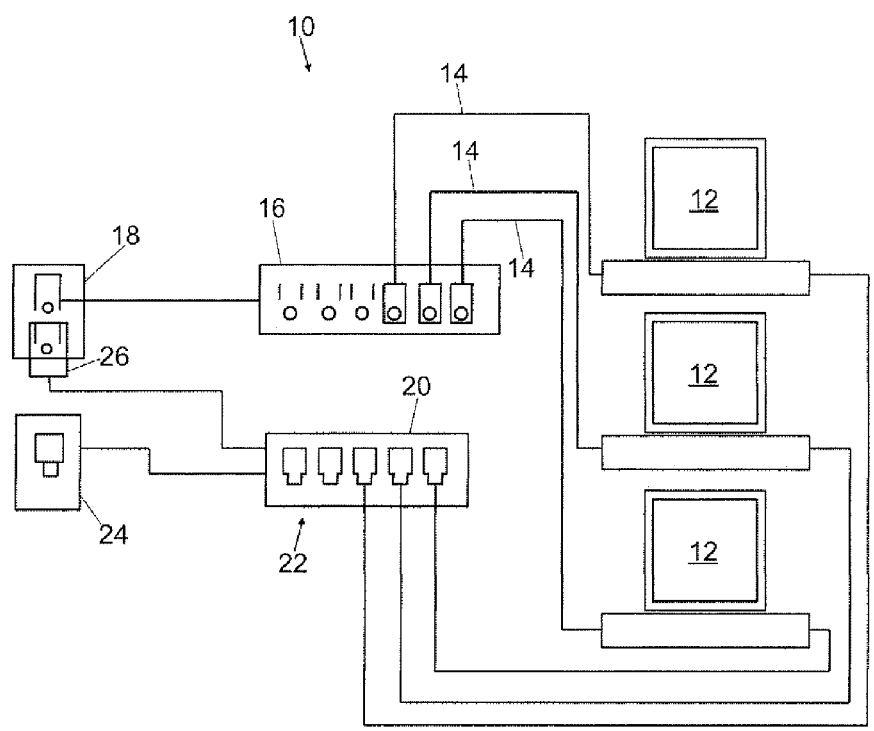
FIG. 1 is a prior art schematic of a power strip and network hub/switch.
Figure 2:
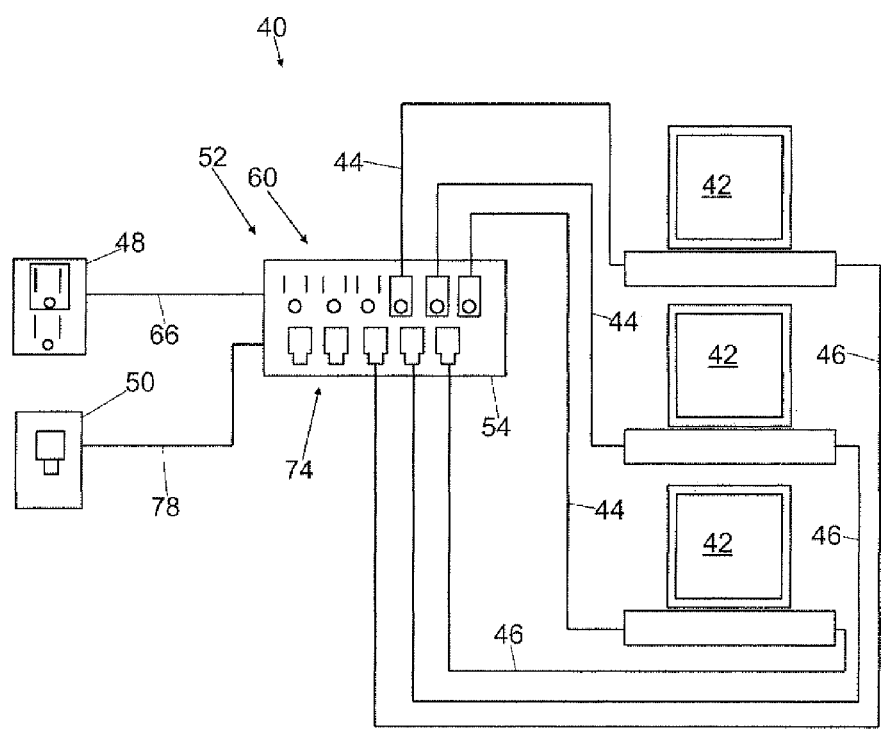
FIG. 2 is a schematic of an exemplary combined network switch and power strip coupled to a computer network.
Figure 3:
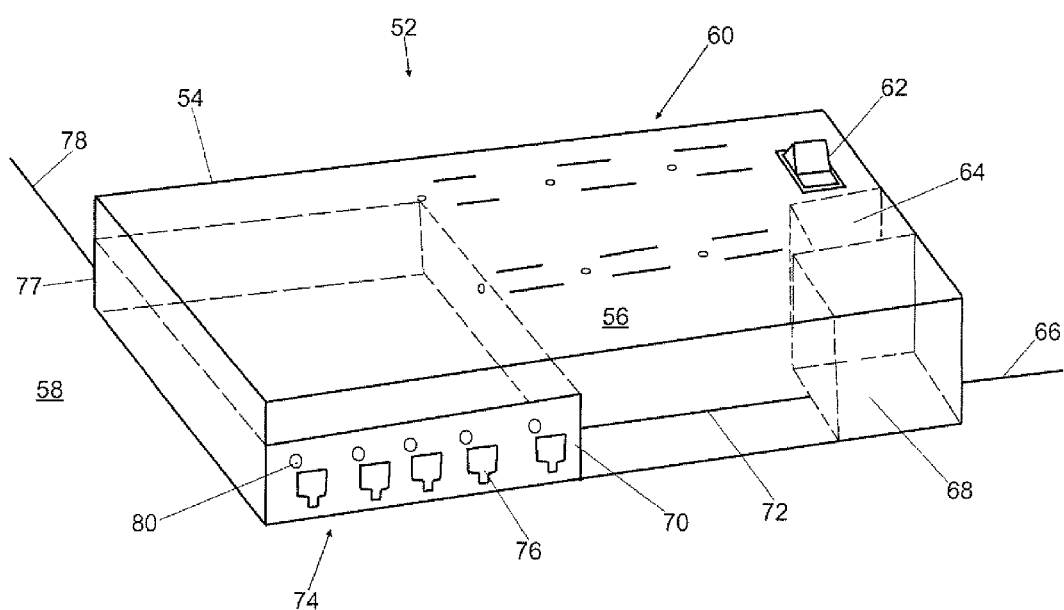
FIG. 3 is a schematic of an exemplary combined network switch and power strip.

Referring to FIGS. 2 and 3, a schematic of an exemplary combined network switch and power strip coupled to a computer network and a perspective view of an exemplary combined network switch and power strip are illustrated respectively. The computer network 40 includes a set of computers 42 having power cords 44 and network cords 46.

The set of computers 42 are configured to couple to an electrical power outlet 48 for supply of electrical power and to couple to a network outlet 50 for network communications.

A combined network switch and power strip 52 is coupled between the set of computers 42 and each of the electrical power outlet 48 and the network outlet 50. The combined network switch and power strip 52 comprises a housing 54 defining an interior 56 and an exterior 58. An array of electrical outlets 60 is disposed in the housing 54 and communicates between the interior 56 and exterior 58. The array of electrical outlets 60 is configured to receive electrical power cords 44 to supply electrical power to the set of computers 42. The array of electrical outlets 60 can comprise six (6) outlets and more in other exemplary embodiments. The array of electrical outlets 60 can provide any style of electrical power, such as US/110, European, Australian and the like. The array of electrical outlets 60 is coupled to an electrical power switch 62 and power surge protector 64.

The electrical power switch 62 is configured to control electrical power to the array of electrical outlets 60. The electrical power switch 62 is disposed in the housing 54 and exposed to the exterior 58. In an exemplary embodiment, the electrical power switch 62 can be a lighted toggle switch. The power surge protector 64 is configured to limit electrical surge through the combined network switch and power strip 52. The power surge protector 64 can comprise a circuit breaker or a fuse disposed in the interior 56 of the housing 54. A power cord 66 is coupled to the power surge protector 64 and a power transformer 68. The power cord 66 extends from the housing 54 and is coupled to the electrical power outlet 48 opposite the power surge protector 64. The power transformer 68 is disposed in the interior 56 of the housing 54. The power transformer 68 conditions the electrical power supply from the power cord 66 (e.g., AC to DC power).

A network switch 70 is disposed in the interior 56 and coupled to the power transformer 68 through a DC (direct current) power bus 72. The network switch 70 communicates with the exterior 58 via a network port array 74. The network port array 74 can comprise one of a 5-port array and 6-port array and 8-port array, or more unmanaged switch. The network port array 74 can be configured to be Medium Dependent Interface (MDI/MDI-X) capable. The network switch 70 is coupled to the network cords 46 at each single port 76 of the network port array 74. The network switch 70 couples to the network outlet 50 through a network connection 77 in a preferred embodiment the network connection can be a network cable 78. An indicator 80 can be coupled to the network port array 74. The indicator 80 is configured to indicate network connections. In an exemplary embodiment, the indicator 80 can be proximate each port 76.

Figure 4:
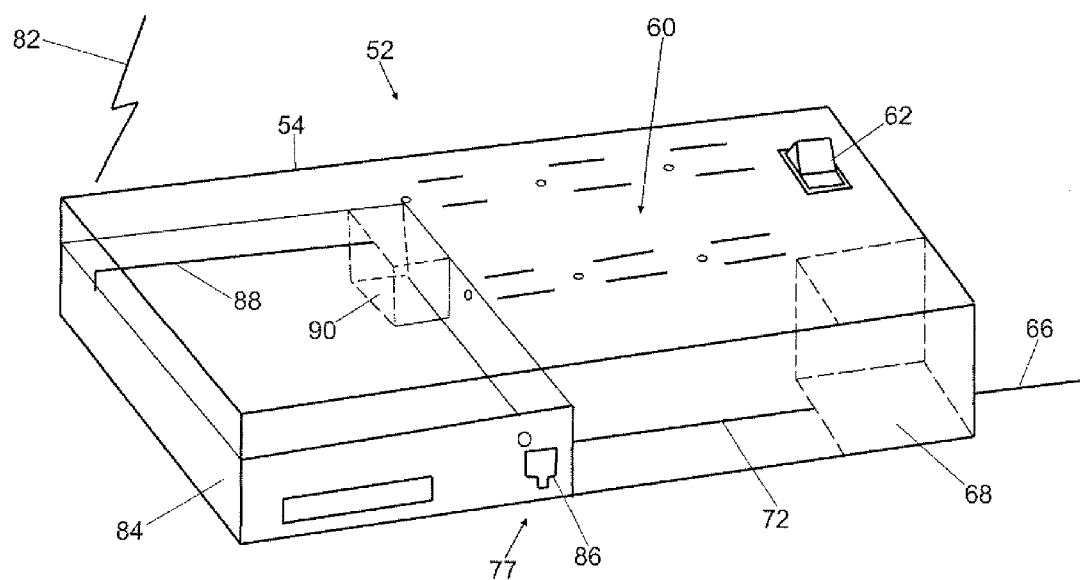
FIG. 4 is a schematic of another exemplary combined network switch and power strip.

Referring to FIG. 4, a schematic of another exemplary combined network switch and power strip is illustrated. The combined network switch and power strip 52 can be configured to couple the computer network 42 to the network outlet 50 through a wireless coupling 82. The network switch and power strip 52 can comprise a wireless router 84 disposed in the housing 54. The wireless router 84 substitutes for the network switch 70. The wireless router 84 is configured to receive a Personal Computer Memory Card International Association PC (PCMCIA/PC) card (not shown) configured for wireless communications. The wireless router 84 includes an upstream network port 86 (i.e., network connection 77) for coupling to the network outlet 50. The wireless router 84 can comprise an antenna 88 and other wireless components, such as a transceiver 90. The wireless router 84 enables the combined network switch and power strip 52 to operate in the absence of network cords 46.

In use, the combined network switch and power strip provides a link between the computer network and the power supply and network connection outlet. The array of electrical outlets receives a number of electrical power cords and the network port array receives a number of network cords. In an alternative embodiment, the network cords are replaced with a wireless coupling. The combined network switch and power strip protects the computer network components from power surges through the electrical power switch and electrical power surge protector. The combined network switch and power strip conditions the electrical power with the power transformer to provide DC electrical power to the network switch (or network hub). The combined network switch and power strip provides a compact uniform package for routing information and supplying electricity.

The risks of having a stand-alone power transformer knocked off a power outlet are greatly reduced. The unmanageable tangle and mess of multiple power strips and hub port switches has been eliminated. Small business and home office network configurations can more easily manage the network connections with limited network outlets. The combined network switch and power strip prevents unwanted computer network downtime due to accidental power disconnection of a network switch.

While embodiments and applications of this disclosure have been shown and described, it would be apparent to those skilled in the art that many more modifications than mentioned above are possible without departing from the inventive concepts herein. The disclosure, therefore, is not to be restricted except in the spirit of the appended claims.

What is claimed is:

1. A combined network switch and power strip comprising:
   a housing defining an interior and an exterior;
   a power cord coupled to said housing;
   a power surge protector disposed in said housing interior and coupled to said power cord;
   an electrical power switch coupled to said surge protector and disposed in said housing in operative communication between said interior and said exterior;
   an array of electrical outlets coupled to said electrical power switch and disposed in said housing in operative communication between said interior and said exterior;
   a power transformer coupled to said power surge protector and disposed in said housing interior;
   a network switch coupled to said power transformer and disposed in said housing interior, said network switch including a network port array in operative communication between said interior and said exterior; and
   a network connection in operative communication with said network switch and a network outlet.

2. The combined network switch and power strip of claim 1 wherein said array of electrical outlets are configured to receive electrical power cords for supply of electrical power.

3. The combined network switch and power strip of claim 1 wherein said array of electrical outlets comprise at least six outlets configured to provide a variety of electrical power.

4. The combined network switch and power strip of claim 1 wherein said power surge protector comprises one of a circuit breaker and a fuse.

5. The combined network switch and power strip of claim 1 wherein said power transformer is configured to condition electrical power from an alternating current to a direct current.

6. The combined network switch and power strip of claim 1 wherein said power transformer is coupled to said network switch through a DC power bus.

7. The combined network switch and power strip of claim 1 wherein said network switch comprises an indicator coupled to said network port array, said indicator configured to indicate network connection.

8. The combined network switch and power strip of claim 1 wherein said network connection comprises one of a network cable and an upstream network port.

9. The combined network switch and power strip of claim 1 wherein said network switch comprises a wireless router having a wireless coupling, said wireless coupling configured to couple to a computer network in the absence of network cords.

10. The combined network switch and power strip of claim 9 wherein said wireless router includes an upstream network port configured to couple to said network outlet.

11. The combined network switch and power strip of claim 9 wherein said wireless router is configured to receive a PCMCIA/PC card configured to for wireless communication.

12. A method for using combined network switch and power strip comprising:
linking a computer network with a power supply and a network connection outlet with a combined network switch and power strip, said combined network switch and power strip includes a housing defining an interior and an exterior, a power cord coupled to said housing, a power surge protector disposed in said housing interior and coupled to said power cord, an electrical power switch coupled to said surge protector and disposed in said housing in operative communication between said interior and said exterior, an array of electrical outlets coupled to said electrical power switch and disposed in said housing in operative communication between said interior and said exterior, a power transformer coupled to said power surge protector and disposed in said housing interior, a network switch coupled to said power transformer and disposed in said housing interior, said network switch including a network port array in operative communication between said interior and said exterior, and a network connection in operative communication with said network switch and a network outlet;
coupling said network connection with said network outlet; and
coupling said power cord with said electrical power outlet.

13. The method of claim 12 wherein said linking said computer network with said network outlet comprises transmitting a wireless connection from said computer network to a wireless router disposed in said housing, said wireless router having a wireless coupling, said wireless coupling configured to couple to a computer network in the absence of network cords.

14. The method of claim 13 wherein said wireless router includes an upstream network port configured to couple to said network outlet.

15. The method of claim 12 wherein said network switch includes a network port array in operative communication between said interior and said exterior and said method further comprises:
receiving at least one electrical power cord in said array of electrical outlets; and
receiving at least one network cord in said network port array.

16. A combined network switch and power strip comprising:
a means for linking a computer network with a power supply and a network connection outlet with the combined network switch and power strip;
a housing means defining an interior and an exterior;
a means for power surge protection disposed in said housing interior and coupled to a means for a power supply;
a means for switching electrical power coupled to said means for power surge protection and disposed in said housing means in operative communication between said interior and said exterior;
a means for receiving electrical cords coupled to said means for switching electrical power and disposed in said housing in operative communication between said interior and said exterior;
a means for transforming power coupled to said means for power surge protection and disposed in said housing interior;
a means for switching network connection coupled to said means for transforming power and disposed in said housing interior; and
a means for connection to a network in operative communication with said network switch and a network outlet.

17. The combined network switch and power strip of claim 16 wherein said a means for switching network connection comprises one of a network switch means and a means for wireless routing.

18. The combined network switch and power strip of claim 16 wherein said means for wireless routing comprises an upstream network port means configured to couple to a network outlet.

19. The combined network switch and power strip of claim 16 wherein said network switch means comprises a network port array means configured to receive at least one network cord means.

20. The combined network switch and power strip of claim 16 wherein said means for receiving electrical cords is configured to receive at least one electrical power cord means.

* * * * *